GERALD T. KEAHL
GOTTFRIED RIESS
ATTILA D. BORONKAY
INVENTORS

BY P. R. Harder
ATTORNEY

United States Patent Office 3,525,942
Patented Aug. 25, 1970

1

3,525,942
CALIBRATION CIRCUIT FOR PHOTOMETRIC ANALYZERS
Attila D. Boronkay, La Habra, Gerald T. Keahl, Fullerton, and Gottfried Riess, Santa Ana, Calif., assignors to Beckman Instruments, Inc., a corporation of California
Filed Feb. 19, 1968, Ser. No. 706,279
Int. Cl. G06g 7/12
U.S. Cl. 328—142         7 Claims

ABSTRACT OF THE DISCLOSURE

There is described a calibration circuit for use with photometric analyzers which provides a straight line approximation of the calibration curve of samples which exhibit limited departure from the Lambert-Beer law. The output of a photometric analyzer passes a log converter to provide an electrical signal proportional to the absorbance of the sample. This signal is applied across a potential divider to satisfy the equation $V_0 = k_1 V_A$, a variable potentiometer allowing adjustment of $k_1$. An operational amplifier is connected to receive the algebraic sum of $V_A$ and a negative potential and has its output connected through a second potentiometer and a diode to the output impedance such that, when the output signal $V_A$ reaches a predetermined limit, the signal across the output impedance is $V_0 = k_2 V_A$. In this way the calibration curve may be approximated by a pair of linear equations.

---

This invention relates generally to a calibration circuit for providing a straight line approximation of calibration curves and more particularly to a calibration circuit particularly adapted for use with photometric analyzers for calibrating the output thereof for samples which exhibit departure from the Lambert-Beer law.

According to the Lambert-Beer law, the concentration of a substance in solution is equal to a constant times the absorbance of the solution at a wavelength where it absorbs radiant energy. As long as the sample faithfully follows the Lambert-Beer law, no difficulty arises in providing an output from an analyzer which is directly proportional to the concentration of the sample in solution and the output may be made to read directly in concentration units. Although many samples follow the Lambert-Beer law over a limited range, most samples exhibit a departure therefrom to varying degrees and therefore an output which represents sample absorbance as a true function of the concentration of the sample only over the limited range in which the sample does not depart from the Lambert-Beer law. While several methods have been utilized to provide an output which is ordinarily proportional to the concentration of a sample even over a range where the relationship between absorbance and concentration is not a simple proportion, these methods and circuits are difficult to calibrate and are not as accurate as is generally desired.

The present invention provides a relatively simple circuit for use with photometric analyzers which provides a straight line approximation of calibration curves for samples that exhibit limited departures from the Lamber-Beer law. For reasonably limited departures from the Lambert-Beer law the calibration curve can be approximated with reasonable accuracy by straight lines. If the sample exhibits a large departure from the Lambert-Beer law, the disclosed calibration circuit is not suitable; however, for samples which exhibit such a large departure, the absorbance method of determining the concentration of the sample is not suitable for accurate chemical analysis.

Figure 2:
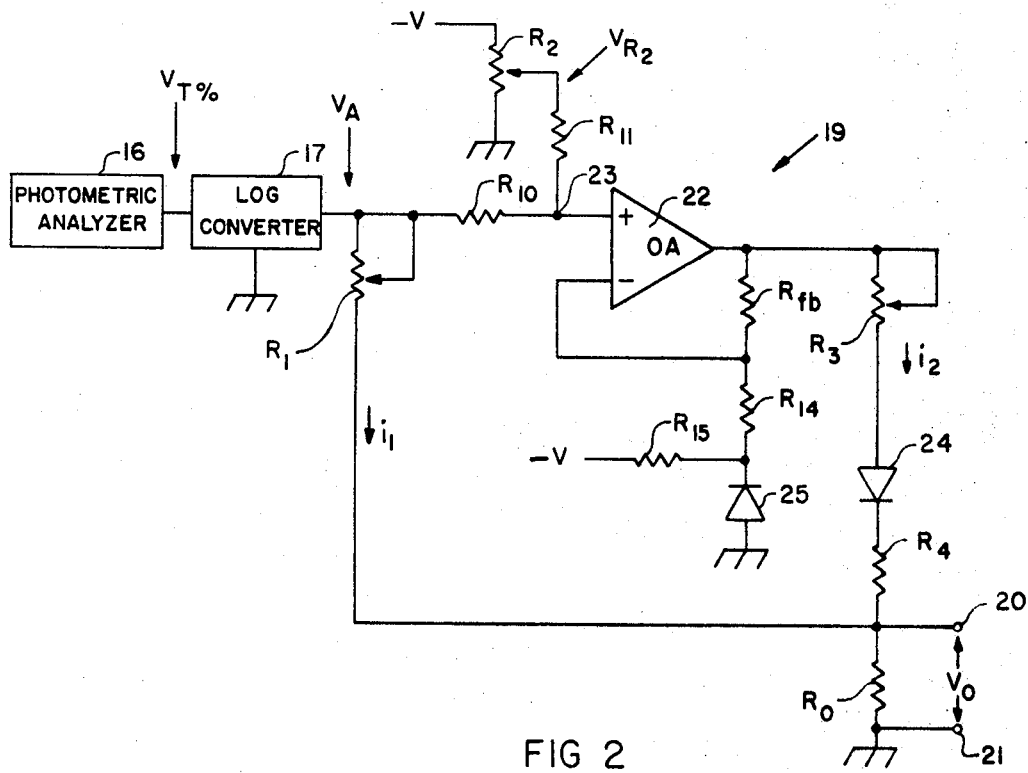
Figure 1:
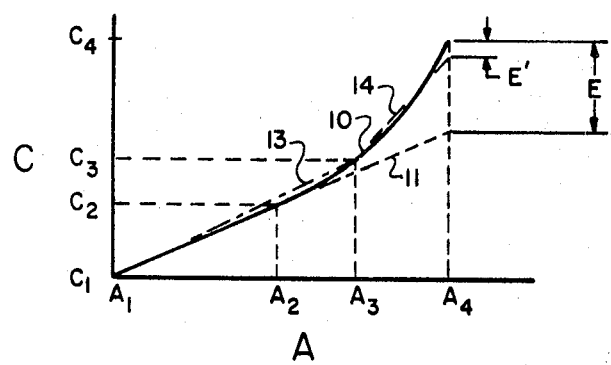

The various features and many advantages of this invention will become more readily appreciated by those skilled in the art as the same becomes better understood by reference to the following detailed description when considered in connection with the accompanying drawing and in which:

FIG. 1 is a graph of a calibration curve for a sample which exhibits departure from the Lambert-Beer law and which illustrates the straight line approximation of such curve obtained by use of the circuit of FIG. 2; and FIG. 2 is the schematic diagram of a photometric analyzer embodying a calibration circuit constructed in accordance with the teachings of this invention.

Referring now to FIG. 1, the curve 10 represents the absorbance A, the optical density of the solution at a wavelength at which it absorbs, as a function of the concentration C of the sample in the solution. The Lambert-Beer law states that the concentration of a substance in solution is proportional to the optical density of the solution of unit path-lengths at the wavelength where it absorbs and is represented by the dashed line 11 and the equation:

$$C = kA \quad (1)$$

where C is the concentration, $k$ is a constant and A the absorbance of the sample. As is apparent from the curves, the sample follows the Lambert-Beer law over the range from concentration of $C_1$ to $C_2$ and then exhibits a non-linear departure therefrom. If the output of the photometric analyzer is calibrated on the basis of the Lambert-Beer law, E represents the error due to such calibration at the concentration $C_4$.

Lines 13 and 14 represent a straight line approximation of a curve 10 and are both straight lines which intersect at the point $C_3$, $A_3$. Line 13 may therefore be represented by the equation $$C = k_1 A \quad (2)$$

between the limits $A_1$ and $A_3$ and line 14 is represented by the equation $$C = k_2 A \quad (3)$$

between the limits of $A_3$ and $A_4$. If the output of a photometric analyzer can be calibrated according to Equations 2 and 3, the maximum error of the output for the curves illustrated is E' at the value $C_4$ and it is apparent that this error is much less than the total error at this value if the output is calibrated according to the Lambert-Beer law.

Referring now to FIG. 2 there is illustrated a photometric analyzer incorporating a calibration circuit constructed after the teachings of this invention in which the output signal is a close approximation of two linear equations. There is illustrated as block 16 a photometric analyzer of any well-known type having an output signal which is proportional to the percent transmittance of the sample being analyzed and may take any suitable form well known in the art. Both ratio recording and optical null spectrophotometers, for example, generally provide an output signal which is proportional to the transmittance of the sample.

As is well known, the absorbance of a sample is related to the transmittance thereof by the equation $$A = \text{Log}_{10} \frac{1}{T} \quad (4)$$

and by coupling to the output of the analyzer a log converter 17, an output signal $V_A$ is provided which is directly proportional to sample absorbance.

The calibration circuit, generally indicated by the numeral 19 is connected across the output of the log converter 17 and is provided with a pair of output terminals 20, 21 connected across output impedance or resistor $R_0$.

The first portion of the calibration circuit utilized to satisfy Equation 2 comprises the potentiometer or variable impedance $R_1$ and the output impedance $R_0$ connected across the output of the log converter as a potential divider. The output voltage $V_0$ is thus given by the equation $$V_0 = \frac{R_0}{R_1 + R_0} \cdot V_A \tag{5}$$

which is a linear equation in the form of Equation 2. By appropriate adjustment of $R_1$ such that $$\frac{R_0}{R_1 + R_0} = k_1 \tag{6}$$

the output voltage $V_0$ is directly proportional to the concentration of the sample if $$V_A \leq V_{R_2} \tag{7}$$

The significance of $V_{R_2}$, which represents the intersection of the straight lines 13 and 14 at $C_3$, $A_3$ of the graph or the break-point, will be later described. In any event, it can be seen that by the use of the potential divider with variable impedance $R_1$ adjusted appropriately, Equation 6 is satisfied and the output voltage $V_0$ is directly proportional to the concentration of the sample. By appropriate calibration of the meter, recorder, digital printer or other readout device connected to the output terminals 20, 21, the concentration of the sample, between the limits of $A_1$ and $A_3$, FIG. 1, may be read directly within the error of the straight line approximation.

The second portion of the calibration circuit is utilized to sense the magnitude of the log converter output $V_A$ and modifies the current flowing through the output impedance $R_0$ such that Equation 3 is satisfied between the limits of $A_3$ and $A_4$. The operational amplifier 22 has as its input the algebraic sum of the output of log converter 17 of $V_A$ and the voltage from the potentiometer $R_2$ which is connected across any suitable source of voltage V having a polarity opposite that of $V_A$, which in the instant embodiment is a source of minus potential, $-V$. The voltage at the arm of the potentiometer is $V_{R_2}$ and, with the output of the log converter $V_A$, is applied algebraically through a 2 to 1 potential divider represented by resistors $R_{10}$ and $R_{11}$ connected to form a summing junction 23. The output of the amplifier is connected through potentiometer $R_3$, a unidirectional conducting device such as diode 24, and current limiting resistor $R_4$ to the junction of divider $R_1$ and $R_0$. The output is also connected through the feedback resistor $R_{fb}$ to the negative input terminal of the operational amplifier, this terminal also being connected through resistor $R_{14}$, which is equal in value to the feedback resistor $R_{fb}$, and diode 25 to circuit ground, the junction of resistor $R_{14}$ and diode 25 being connected through resistor $R_{15}$ to a source of negative potential for the purpose of temperature compensation of diode 24 as will hereinafter be described.

It will be recognized that the configuration of the operational amplifier 22 is such that there is no phase inversion of the signal through the amplifier and so long as $V_A$ is equal to or less than $V_{R_2}$ the output of amplifier 22 will be zero or negative and diode 4 reverse biased. Thus the current $i_2$ flowing through diode 24 will be zero. Accordingly, for all cases in which Equation 7 is satisfied, no output current flows from the operational amplifier through output impedance $R_0$ since diode 24 is reverse biased and the Equation 6 remains valid, i.e. the output voltage $V_0$ is directly proportional to the concentration of the solution within the error represented by line 13 of FIG. 1.

When $$V_A \geq V_{R_2} \tag{8}$$

i.e., the output of the log converter $V_A$ exceeds the absolute value of the voltage at the arm of potentiometer $R_2$, the output of the operational amplifier 22 becomes positive and a current $i_2$ flows through diode 24 and output resistor $R_0$. The magnitude of current $i_2$ is determined by potentiometer $R_3$ and is added to the current $i_1$ flowing through $R_0$ as a result of potential divider $R_1$, $R_0$ being connected across the output of the log converter 17.

The output voltage $V_0$ across resistor $R_0$ can thus be described by two linear equations:

$$V_0 = i_1 \cdot R_0 \tag{9}$$

which is valid under the conditions of Equation 7 above and a second equation:

$$V_0 = (i_1 + i_2) R_0 \tag{10}$$

which is valid under the conditions of Equation 8. As has been previously stated, up to the break-point at $R_3$, $C_3$, by appropriate adjustment of $R_1$ Equation 6 is satisfied and the output may be read directly in concentration as represented by Equation 2. Beyond the break-point, Equations 8 and 10 are valid and Equation 10 may be rewritten as:

$$V_0 = V_A \left[ \frac{1}{R_1} + \frac{1}{R_3} \right] R_0 = V_A \frac{R_0 (R_1 + R_3)}{R_1 \cdot R_3} \tag{11}$$

If now $R_3$ is adjusted such that $$R_0 \frac{(R_1 + R_3)}{R_1 \cdot R_3} = k_2 \tag{12}$$

then the slope of the line defined by Equation 11 is the same as that defined by Equation 3 and the output voltage $V_0$ is directly proportional to the concentration of a sample when Equation 8 is satisfied, i.e. beyond the break-point at $C_3$, $A_3$.

It is thus seen that the calibration circuit of FIG. 2 provides an output voltage $V_0$ which is defined by two linear equations which are represented by lines 13 and 14 in FIG. 1. It will further be evident that the potentiometer $R_2$ determines the break-point, potentiometer $R_1$ the slope of line 13, and potentiometer $R_3$ the slope of line 14. By appropriate adjustment of these three potentiometers the output signal $V_0$ may be calibrated for a straight line approximation of most samples which exhibit a departure from the Lambert-Beer law. The presence of current limiting resistor $R_4$ does not affect the validity of the foregoing equations and merely limits the maximum slope of the second linear equation. While the break-point in FIG. 1 is illustrated as the intersection of two linear equations, in practice there is some bending of the curve at this point due to the initial conduction characteristics of diode 24. However, this slight rounding of the curve does not appreciably change the basic operation of the calibration circuit illustrated, and, generally, provides a better approximation to the true calibration curve.

The diode 25 provides temperature stability for the circuit when thermally coupled to diode 24. It will be noted that diode 25 is biased to be conductive at all times during normal operations of the circuitry. The operation of the temperature compensating circuitry can best be illustrated under the condition when the output of operational amplifier 24 is at the break-down voltage of diode 24. Assume that 0.4 volt is required to cause diode 24 to conduct and that the input signals to amplifier 22 are such that its output is at this value. If diode 25 is similar to diode 24, the voltage at the junction of resistors $R_{14}$ and $R_{15}$ will be $-0.4$ volt and, if the values of $R_{14}$ and $R_{fb}$ are equal, a substantially zero input will be applied to the negative input of the operational amplifier. Assume now that a change in temperature causes a slight reduction in the junction potential of diode 24; a similar change in junction potential of diode 25 occurs if the diodes are thermally coupled resulting in a decrease in the voltage at the negative input terminal of operational amplifier 22, that in turn will decrease its output such that the positive output signal is reduced to the point where no current flows through diode 24. This temperature compensation takes place over the entire range of operation of diode 24 to provide a thermally stable system.

In the foregoing description, it has been assumed that the output of the log converter is a positive signal. In a situation where the log converter provides a negative signal as a function of absorbance, the foregoing calibration circuit may be utilized by changing the polarity of the bias voltage and reversing diodes 24 and 25.

There has been ilustrated and described one preferred embodiment of a calibration circuit for use with photometric analyzers to provide a straight-line approximation of calibration curves for samples exhibiting a departure from the Lambert-Beer law. The slope of the linear equations and the break-point are readily controlled by the adjustment of three potentiometers and an output voltage is provided which is directly proportional to the concentration of the sample within the error of the approximation error may be maintained at a minimum by careful selection of the constants of the equations. While the invention has been described in connection with the preferred embodiment illustrated, it is to be understood that various modifications and variations of the circuit are possible without departing from the scope of the invention as defined by the appended claims.

We claim:

1. In an analyzer of the type producing an electrical signal proportional to an optical characteristic of the sample being analyzed, a calibration circuit comprising:
   an output impedance;
   first circuit means including a first variable impedance connected to receive said electrical signal and to said output impedance for producing across said output impedance an output signal that is the product of said electrical signal and a variable proportionality factor;
   variable source means for producing an electrical signal of polarity opposite the polarity of said electrical signal;
   operational amplifier means having an input and an output;
   circuit means connecting said electrical signal and the output of said variable source means to the input of said operational amplifier for producing an input signal thereto that is the algebraic sum of said electrical signal and the output of said variable source means;
   circuit means including variable impedance means and a unidirectional conducting means connected between the output of said operational amplifier and said output impedance for producing across said output impedance an output signal that is the product of said electrical signal and a second variable proportionality factor when said unidirectional means is forward biased.

2. The analyzer according to claim 1 wherein:
   the polarity of the output of said operational amplifier corresponds to the polarity of the input signal whereby said second proportionality factor is greater than said first proportionality factor and said unidirectional conducting means is forward biased when the absolute value of said electrical signal is equal to or greater than the obsolute value of the output of said varibale source means.

3. In an analyzer of the type producing an electrical signal proportional to an optical characteristic of a sample being analyzed, a calibration circuit comprising:
   first circuit means including a first variable impedance and an output impedance connected in seriatim to receive said electrical signal;
   a source of variable potential of polarity opposite the polarity of said electrical signal;
   operational amplifier means having an input and an output;
   circuit means connecting said electrical signal and said source of variable potential to the input of said operational amplifier means whereby the input to said operational amplifier is the algebraic sum of said electrical signal and said variable potential;
   a second variable impedance means;
   a unidirectional conducting means;
   circuit means connecting said second variable impedance, said unidirectional conducting means and said output impedance in seriatim across the output of said operational amplifier means.

4. In an analyzer of the type producing an electrical signal proportional to an optical characteristic that is a function of a property of the sample being analyzed, a calibration circuit comprising:
   first circuit means connected to receive said electrical signal for producing a first output signal equal to the product of said electrical signal and a first proportionality factor;
   operational amplifier means having an input and an output;
   second circuit means connected to receive said electrical signal and to the input of said operational amplifier for applying to said input a signal proportional to the difference between said electrical signal and a reference potential;
   third circuit means connected to the output of said operational amplifier and to said first circuit means and modifying said first output signal when said electrical signal reaches a predetermined value such that said first output signal is the product of said electrical signal and a second proportionality factor.

5. In the analyzer according to claim 4 wherein:
   said second circuit means includes means for varying said predetermined value.

6. In the analyzer according to claim 5 wherein:
   said first circuit means includes means for varying said first proportionality factor.

7. In the analyzer according to claim 6 wherein:
   said third circuit means includes means for varying said second proportionality factor.

References Cited

UNITED STATES PATENTS

| | | | |
|---|---|---|---|
| 3,089,093 | 5/1963 | Rochester | 328—143 |
| 3,268,813 | 8/1966 | Pendleton | 324—119 |
| 3,277,318 | 10/1966 | Bedford | 328—143 |
| 3,428,884 | 2/1969 | Nordahl | 307—229 |

DONALD D. FORRER, Primary Examiner

D. M. CARTER, Assistant Examiner

U.S. Cl. X.R.

328—2, 162, 172; 307—229, 311

PO-1050
(5/69)

UNITED STATES PATENT OFFICE
CERTIFICATE OF CORRECTION

Patent No. 3,525,942      Dated August 25, 1970

Inventor(s) Gerald T. Keahl, Gottfried Riess and Attila D. Boronkay

It is certified that error appears in the above-identified patent and that said Letters Patent are hereby corrected as shown below:

Column 3, line 21, change the period (.) after "appropriately" to a comma (,); Column 3, line 35, after the numeral 17, "of" should be --or--; Column 3, line 50, after "diode" delete the numeral 4 and insert --24--; Column 4, line 13, "$R_3$" should read --$A_3$--; Column 5, line 14, after "error" insert a period (.); Column 5, line 14, after the period and before "may" insert --The approximation error--.

SIGNED AND
SEALED
NOV 3 1970

(SEAL)
Attest:

Edward M. Fletcher, Jr.
Attesting Officer

WILLIAM E. SCHUYLER, JR.
Commissioner of Patents